United States Patent [19]

Stewart

[11] Patent Number: 4,687,217
[45] Date of Patent: Aug. 18, 1987

[54] SHIELD FOR AUTOMOTIVE VEHICLE

[76] Inventor: Derrel N. Stewart, 6041 Thornwood Dr., Hamburg, N.Y. 14075

[21] Appl. No.: 693,384

[22] Filed: Jan. 22, 1985

[51] Int. Cl.⁴ .............................................. B62D 25/16
[52] U.S. Cl. .................................. 280/153 R; 296/198
[58] Field of Search ........ 280/152 R, 153 R, 154.5 R; 296/198

[56] References Cited

U.S. PATENT DOCUMENTS

| | | | |
|---|---|---|---|
| 1,719,646 | 7/1929 | Blair | 280/152 R |
| 2,234,781 | 3/1941 | Schjolin | 280/152 R |
| 2,538,839 | 1/1951 | Limberg | 280/152 R |
| 3,086,794 | 4/1963 | Garrett | 280/152 R |
| 3,341,222 | 9/1967 | Roberts | 280/154.5 R |
| 3,675,943 | 7/1972 | Moore | 280/154.5 R |
| 3,684,311 | 8/1972 | Pierce | 280/152 |
| 3,838,881 | 10/1974 | Hill | 296/28 |
| 4,115,974 | 9/1978 | Purcell | 52/512 |
| 4,138,129 | 2/1979 | Morris | 280/152 |
| 4,227,718 | 10/1980 | Durben | 280/770 |

FOREIGN PATENT DOCUMENTS 441843  1/1936  United Kingdom ............ 280/152 R

Primary Examiner—John J. Love
Assistant Examiner—Richard Camby
Attorney, Agent, or Firm—Joseph P. Gastel

[57] ABSTRACT

A shield for mounting on an automobile body for protecting the frame and other parts thereof including a main shield portion, front and rear edge portions on the main shield portion, a top edge portion on the main shield portion, fasteners for connecting the edge portions to the automobile body, and a lower concave edge portion for placement in spaced relationship to the brake structure of the automobile.

20 Claims, 19 Drawing Figures

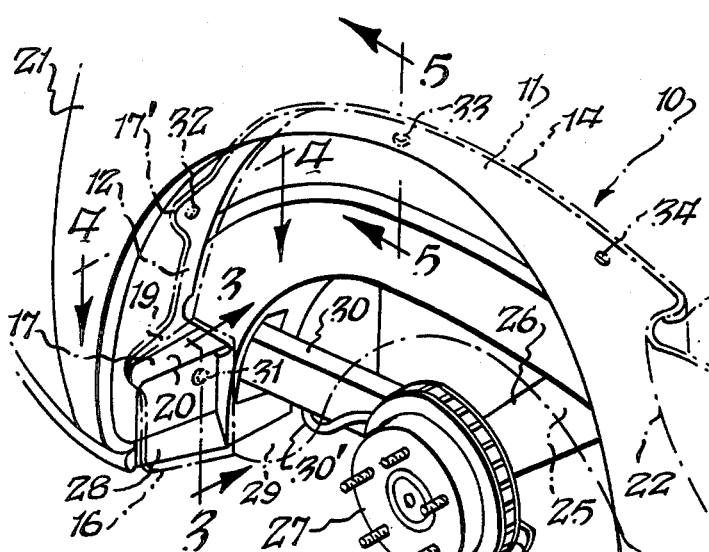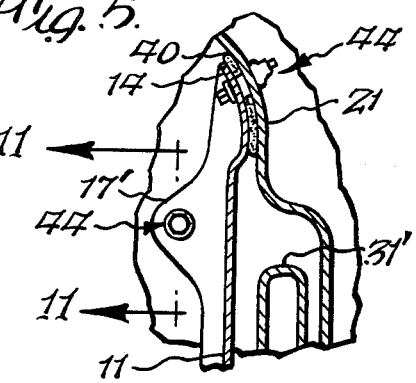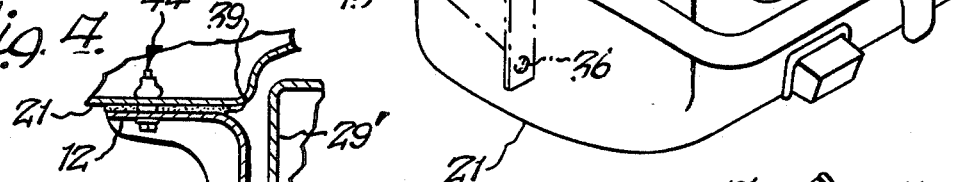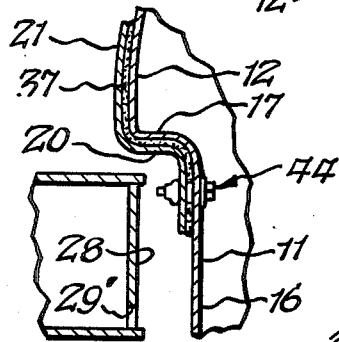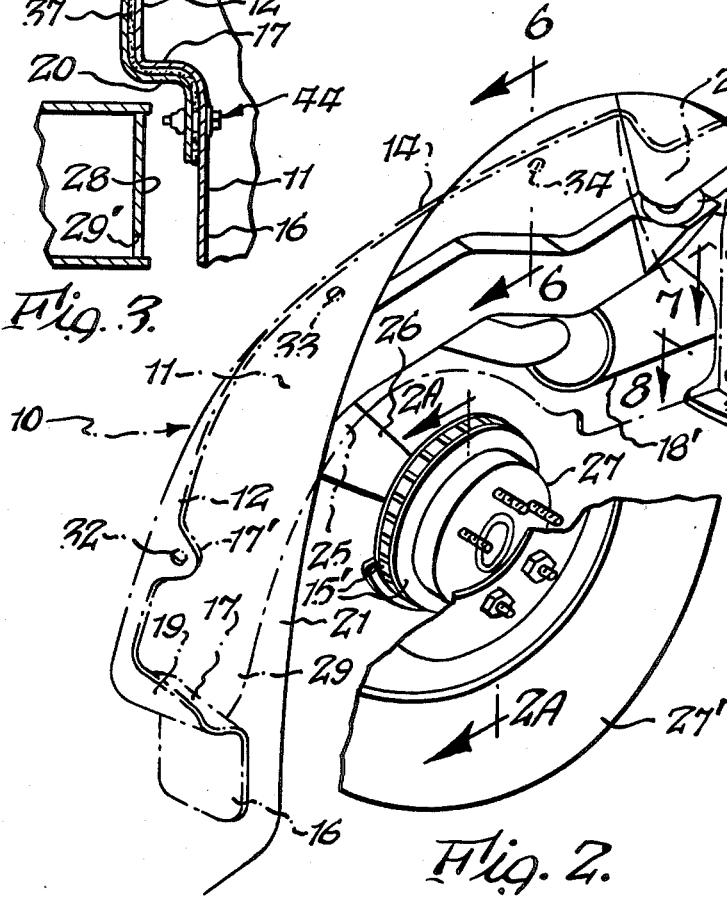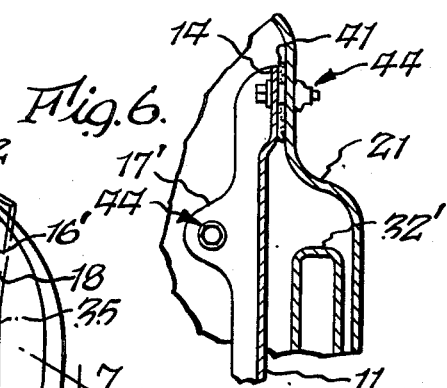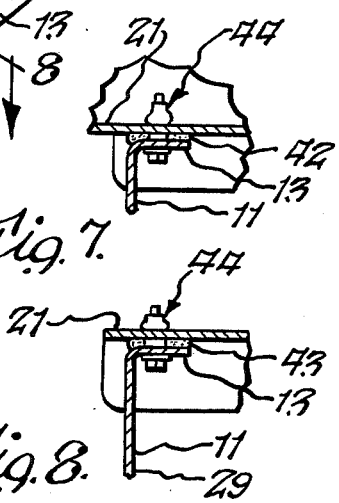

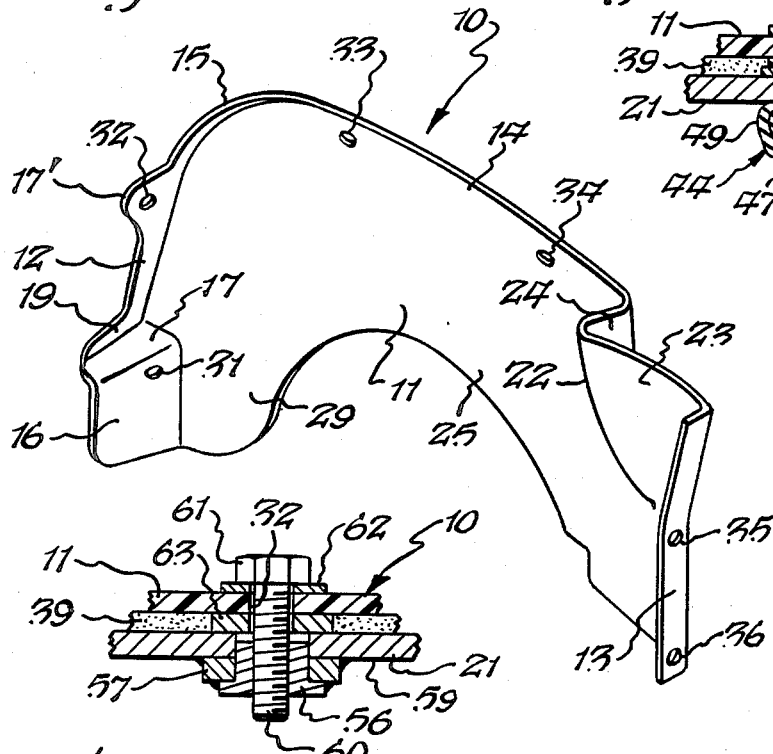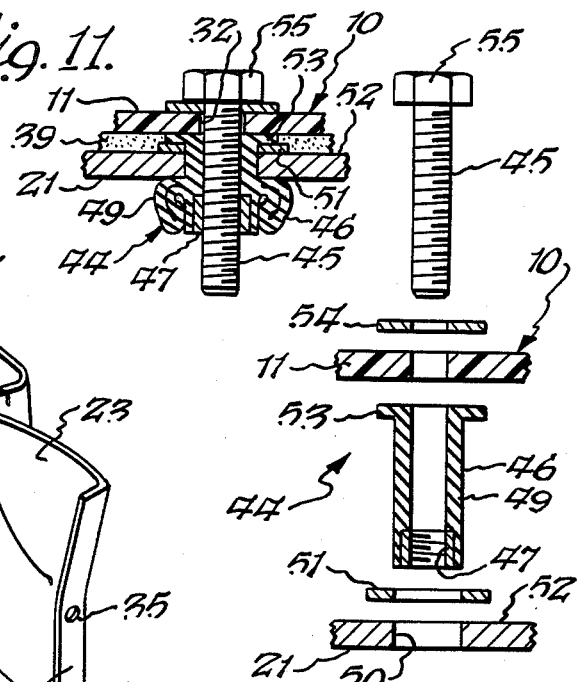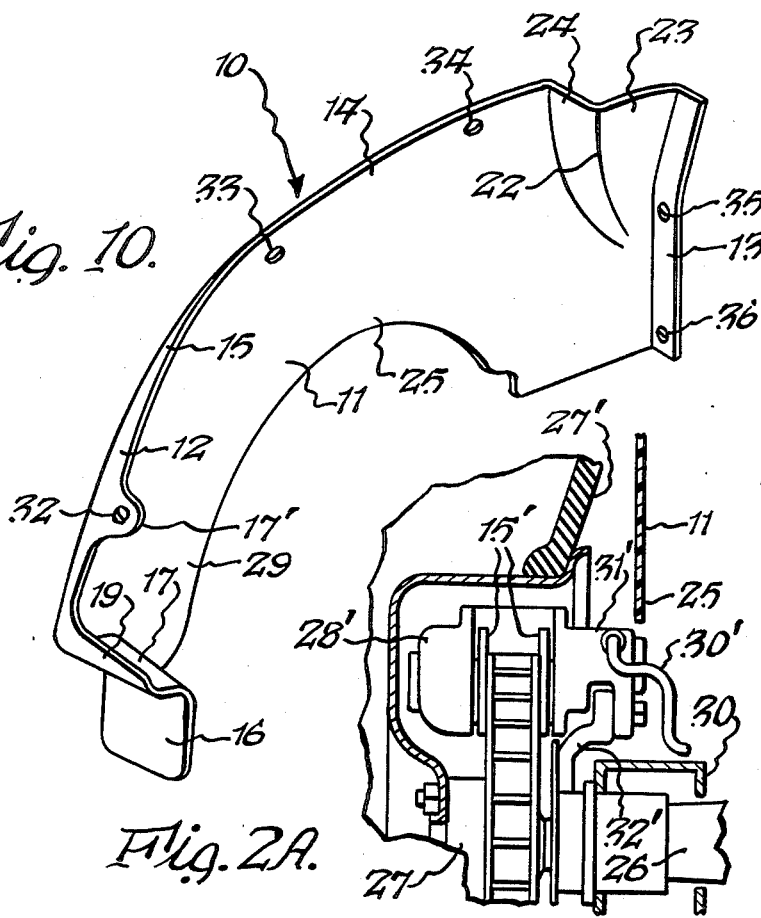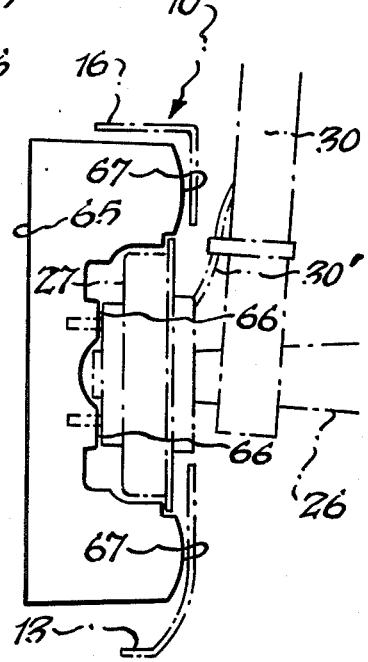

SHIELD FOR AUTOMOTIVE VEHICLE

BACKGROUND OF THE INVENTION

The present invention relates to a shield for mounting on an automobile body to protect the frame and other parts of the automobile from wheel-thrown debris.

By way of background, in Corvette vehicles the rear wheels throw debris onto various parts, such as the frame, trail arm, gas lines, brake lines, body mounts, shocks, shock mountings and gas tank. This causes these parts to rust out because the debris contains corrosive substances such as salt, and the rebuilding of the rusted parts is expensive. It is with overcoming the foregoing problem that the present invention is concerned.

SUMMARY OF THE INVENTION

It is accordingly the primary object of the present invention to provide a shield for mounting on the body of an automobile to protect the frame and other parts from wheel-thrown road debris.

Another object of the present invention is to provide a shield which can be mounted on an automobile body in an extremely simple and expedient manner and which can be sealed to the body. Other objects and attendant advantages of the present invention will readily be perceived hereafter.

The present invention relates to a shield for mounting on the body of an automobile having a frame supporting the body, an axle mounted on the frame, a wheel well in the body, a wheel located in the wheel well and mounted on said axle and a brake structure mounted on said axle, said shield being for protecting the frame and other parts of the automobile from matter thrown by said wheel during rotation thereof, said shield comprising a main body portion having an upper edge, a lower edge a forward edge and a rear edge, fastening means on certain of said edges for attaching said shield to said body, and said lower edge being of generally concave configuration for providing a clearance with said brake structure.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view, with certain parts of the automobile omitted, looking forwardly into the rear wheel well of an automobile body and showing in phantom lines the shield mounted on the automobile body and its relationship to various parts of the automobile;

FIG. 2 is a fragmentary perspective view similar to FIG. 1 but looking rearwardly into the rear wheel well, with certain parts of the automobile omitted, and showing in phantom lines the shield mounted on the automobile body and its relationship to various parts of the automobile;

FIG. 2A—2A is a fragmentary cross-sectional view taken substantially along line 2A—2A of FIG. 2 and showing the relationship between certain brake structure mounted on the axle and the lower edge of the shield;

FIG. 3 is a fragmentary cross sectional view taken substantially along line 3—3 of FIG. 1 and showing the attachment between the automobile body and the shield at this location and the relationship between the shield and an adjacent part of the automobile frame which normally receives wheel-thrown debris;

FIG. 4 is a fragmentary cross sectional view taken substantially along line 4—4 of FIG. 1 and showing the attachment between the shield and the automobile body at this location and the relationship between the shield and an adjacent part of the automobile frame which normally receives wheel-thrown debris;

FIG. 5 is a fragmentary cross sectional view taken substantially along line 5—5 of FIG. 1 and showing the attachment between the shield and the automobile body at this location and the relationship between the shield and an adjacent part of the automobile frame which normally receives wheel-thrown debris;

FIG. 6 is a fragmentary cross sectional view taken substantially along line 6—6 of FIG. 2 and showing the connection between the shield and the automobile body in this location and also showing the relationship between the shield and an adjacent part of the automobile body which normally receives wheel-thrown debris;

FIG. 7 is a fragmentary cross sectional view taken substantially along line 7—7 of FIG. 2 and showing the connection between the shield and automobile body in this location;

FIG. 8 is a fragmentary cross sectional view taken substantially along line 8—8 of FIG. 2 and showing the connection between the shield and the automobile body in this location;

FIG. 9 is a perspective view of the shield of the present invention looking forwardly from the rear thereof;

FIG. 10 is a perspective view of the shield of the present invention looking rearwardly from the front thereof;

FIG. 11 is a fragmentary cross sectional view taken substantially along line 11—11 of FIG. 5 and showing one type of fastener which may be used for securing the frame shield to the automobile body;

FIG. 12 is an exploded view showing the parts of the fastener of FIG. 11;

FIG. 13 is a schematic view showing a gauge member located against the brake drum for the purpose of determining whether there will be sufficient clearance between the wheel and the shield in its installed position;

FIG. 14 is a fragmentary cross sectional view of another type of fastening structure which can be used to attach the shield to the automobile body;

DESCRIPTION OF THE PREFERRED EMBODIMENTS

Figure 15:
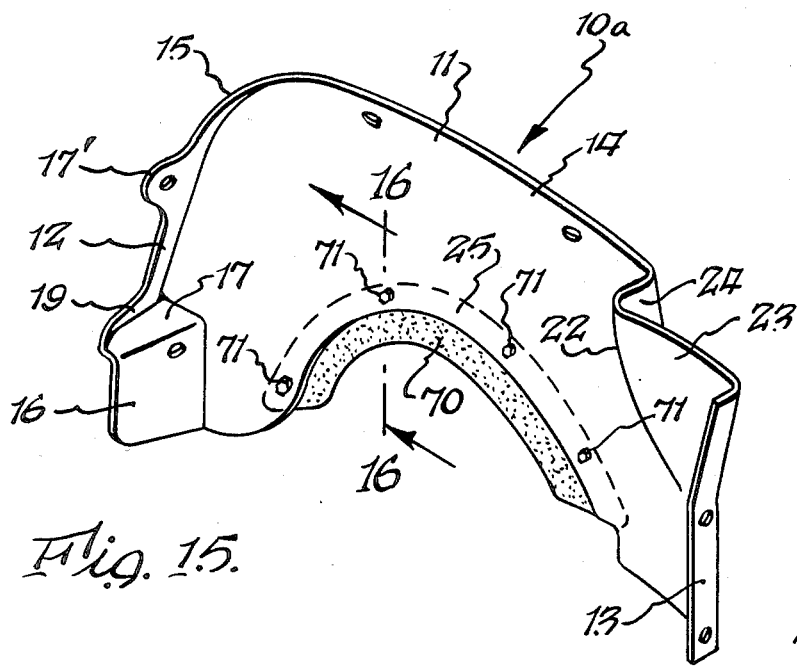
FIG. 15 is a perspective view of a modified shield having a flexible curtain attached to the lower portion thereof.
Figure 16:
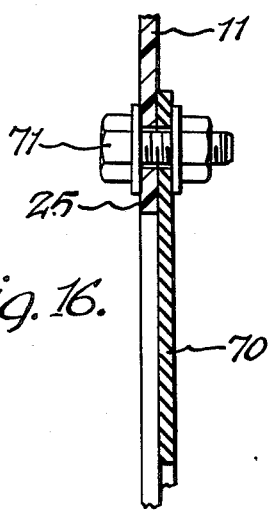
FIG. 16 is a fragmentary enlarged cross sectional view taken substantially along line 16—16 of FIG. 15.

The shield 10 of the present invention is shown in solid lines in FIGS. 9 and 10 and is shown in phantom lines relative to the body and frame of an automobile in FIGS. 1 and 2. As noted briefly above, the shield 10 is for attachment to the body of the automobile, and when so attached it protects the various parts which can rust out.

The shield 10 is fabricated from an epoxy-fiberglass composition and is substantially rigid, but it is slightly yieldable. It includes a main body portion 11 having a forward edge portion 12 in the nature of a flange which extends substantially perpendicularly to main body portion 11, and it also includes a rear edge portion 13 in the nature of a flange which also extends substantially perpendicularly to main body portion 11. Front edge portion 12, as can be seen from FIG. 10, gradually merges into upper edge portion 14 in the area designated by numeral 15. An ear 17' is formed integrally with front edge portion 12. A lower front portion 16 also extends substantially perpendicularly to main body portion 11, and it includes a shoulder 17 which merges into portion 19 of front edge portion 12. Shoulder 17 is formed to rest on shoulder 20 of the automotive body 21 (FIG. 3). A pocket-like concave depression 22 (FIGS. 9 and 10) having sides 23 and 24 is formed as shown between the rear edge portion 13 and main body portion 11, and portion 22 extends around portion 18 of the frame 20 which carries a rubber body mount 16' (FIG. 2).

The lower edge portion 25 of the main body portion 11 is of concave configuration so as provide clearance with the brake caliper portion 31' (FIG. 2A) which is mounted on the axle-carrying trail arm 30 by casting 32' which holds the brake caliper 28' at approximately the one o'clock position relative to brake discs 15' when the brake drum is viewed from outside of the automobile. The front portion 16 protects the adjacent portion 28 of the frame from road debris thrown by the vehicle wheel 27' mounted on drum 27 carried by axle 26, and it also keeps drain hole 29' in the frame clear of debris. The ends of the shield which are located at opposite ends of concave lower edge 25 extend downwardly further than the central portion of concave edge 25 to protect adjacent parts of the automobile in those areas, while the upper central portion of concave edge 25 provides clearance with the above-described brake structure.

The portion 29 of the main body portion 11 shields the trail arm 30 from wheel-thrown debris as well as shielding the brake line 30'. The shield also shields adjacent portions of the frame and body including gas lines, body mounts, shocks, shock mountings, muffler 18' (FIG. 2) and the gas tank from wheel-thrown debris. In addition the shield reduces tire and road noise transmitted to the passenger compartment and also reduces under car air turbulence caused by tire rotation in previously open wheel wells.

The shield 10 is originally formed with dimples (not shown) located where holes 31, 32, 33, 34, 35 and 36 are shown. These dimples are drilled out by the installer to form holes 31-36. Hole 31 is in lower front portion 16; hole 32 is in ear 17'; holes 33 and 34 are in upper edge portion 14; and holes 35 and 36 are in rear edge portion 13. Thereafter, the shield 10 is placed in position, and it is of a shape along its upper, forward and rear edges to lie in generally complementary mating relationship with adjacent portions of vehicle body 21. The frame shield 10 is then used as a templet to drill holes in the vehicle body 21 which coincide with holes 31-36.

A seal is formed in place between adjacent portions of the edges of frame shield 10 and the portions of the vehicle body 21 to which they are attached. The material from which the seal is formed may be General Electric Silicone II "The Home Pro TM Line". To form the seal, the inside portions of the vehicle body 21, which will be adjacent to the edge portions of the shield 10, are waxed. Thereafter, the seal material is spread on the edge portions 12, 13 and 14 of the shield 10 and it is pressed in position against the vehicle body with the seal material therebetween. Suitable fasteners, as will be described hereafter, are used to secure the shield in position. The seal will thus be formed between the adjacent portions of the shield and the vehicle body, and the seal material will cure in the shape to which it was formed. If it is ever necessary to remove the shield, the seal material will adhere thereto but not adhere to the vehicle body because the wax on the latter acts as a release agent. The seal is shown at 37 in FIG. 3, at 39 in FIG. 4, at 40 in FIG. 5, at 41 in FIG. 6, at 42 in FIG. 7 and at 43 in FIG. 8, but it will be understood that it is a continuous mass along the edge portions of the shield. It can thus be seen that there is a seal between substantially all the edges of the shield and the body to not only prevent debris from passing the shield in these areas, but to also act as a sound deadener for the body. The frame parts which are protected by shield 10 are shown at 28 in FIG. 3, at 29' in FIG. 4, at 31' in FIG. 5 and at 32' in FIG. 6. In addition, the main body portion 11 of the shield which lies inwardly of the various edges protects other of the above-enumerated parts of the automobile.

The preferred way of attaching the frame shield 10 to the body 21 is by the use of fasteners known under the trademark POP WELL-NUTS, which are shown in exploded form at 44 in FIG. 12. The WELL-NUTS include a threaded bolt 45, and a nut member 46 which includes a flexible resilient neoprene sleeve portion 49 and an internally threaded nut 47 for receiving bolt 45. In use, the sleeve 49 is passed through hole such as 50 in the vehicle body 21, hole 50 having been previously drilled by using the shield 10 as a templet. A resilient washer 51 may be interposed, if necessary, between surface 52 of body 21 and annular head 53 of nut member 46. Another washer 54 is interposed between shield 10 and head 55 of bolt 45. When the bolt 45 is tightened to the condition shown in FIG. 11, sleeve portion 49 will collapse and expand radially to the condition shown in FIG. 11 to thereby hold shield 10 in position. The fasteners 44 are shown at the various locations in FIGS. 3, 4, 5, 6, 7 and 8. If bolt 45 is removed from threaded engagement with nut 47, sleeve portion 49 will expand back to the elongated condition shown in FIG. 12, but it will be retained in its associated hole because of an interference fit therewith. The advantages of using the type of fasteners described above is that the shield can be mounted from one side and there is no need to hold nuts or the like on the opposite side of the vehicle body from the shield, and, further, sleeves 49, being fabricated of neoprene provide mountings which are leakproof, sound-deadening and shock-absorbing. However, it will be appreciated that any type of suitable fasteners can be used.

A fastener of another type is shown in FIG. 14 wherein a nut 56 is adhesively secured to a base 57 which in turn is adhesively secured to inner surface 59 of the automobile body. A bolt 60 is received by nut 56, and it has a head 61 which bears against washer 62 which presses on shield 10. A washer 63 is interposed between shield 10 and vehicle body 21 to provide space for seal 39.

A gauge 65 is shown in FIG. 13 for insuring clearance between the shield 10 and the tire after the latter has been mounted on drum 27. The gauge obviates the necessity for mounting the tire itself to determine whether sufficient clearance exists. The use of the gauge with each individual vehicle is necessary because the vehicle bodies vary in dimensions because of the manner in which they are fabricated. Gauge 65 is essentially a stiff thin planar member of the configuration shown in FIG. 13 and it has edges 66 which press against the face of drum 27. The outer edges 67 of the gauge 65 are of the configuration of the side of the tire when it is mounted on drum 27. If there is sufficient clearance after the shield 10 has been initially mounted on the body of the automobile, as described hereafter, the sides 67 will not touch the shield as the gauge 65 is rotated about the axis of axle 26. If the shield is touched by sides 67, it has to be adjusted to a different position. In use, the shield is attached to the automobile body by two fasteners 44 extending through holes 33 and 34 (FIG. 1). The gauge 65 is then placed in the position of FIG. 13 and swing about the horizontal axis of the axle. If surfaces 67 touch any parts of shield 10 near the extreme ends thereof, the ends of the shield 10 are physically biased away from the gauge to a position where the shield is not touched by the gauge, and in such a position the holes 31, 32, 35 and 36 are used to locate the points at which the body is drilled to receive the fasteners 44. The shield can be biased in the foregoing manner because it flexes about the upper bolts which secure the shield to the body through holes 33 and 34.

Because of the fact that car bodies vary in dimensions, the thickness of the washers used with a given shield may vary, that is, a shield may use washers of different thicknesses at different locations 31–36 to compensate for variations in spacing between the shield and the automobile body. The shield itself should not touch the body at any location, and the washers, such as 51 and 53, achieve this purpose.

A modified shield 10a is shown in FIG. 15. This frame shield is identical in all respects to shield 10 of the previous figures except that it has a flexible skirt 70 attached to lower edge portion 25 by means of nut and bolts 71. Skirt 70 is preferably made of rubber and provides an extension of the shield around brake structure 31' and axle 26 (FIGS. 1 and 2) to prevent wheel-thrown debris from passing between these parts and the lower edge 25 of shield 10a. As the axle moves upwardly, the latter will yield if contacted by any parts carried by the axle. The concave edge 25 of the frame shield is spaced sufficiently far from axle 26 so that it cannot be contacted by any parts carried thereby.

Figure 17:
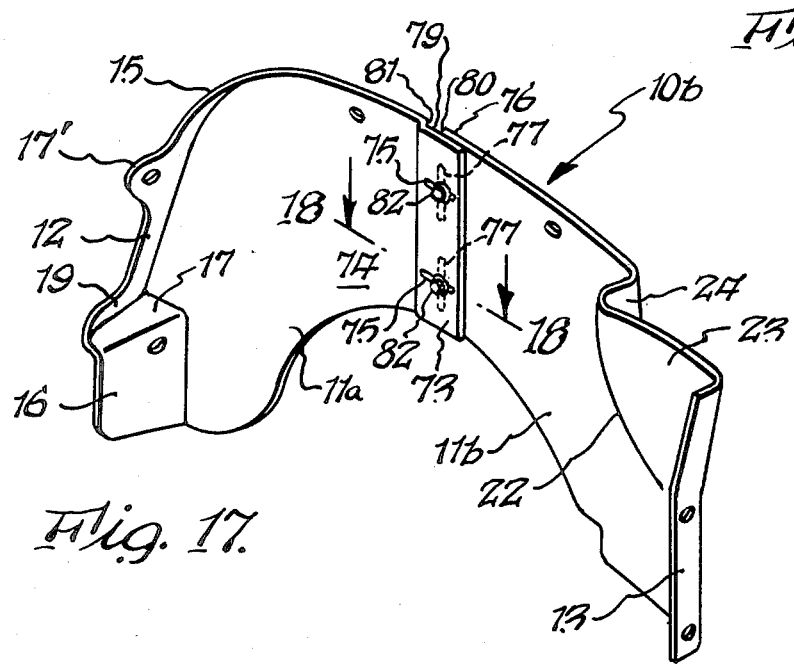
FIG. 17 is a perspective view of another embodiment of the present invention comprising an adjustable shield.
Figure 18:
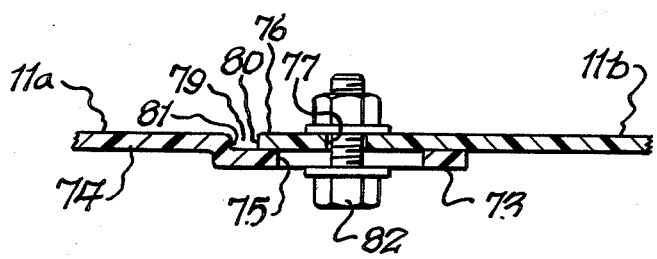
FIG. 18 is a fragmentary cross sectional view taken substantially along line 18—18 of FIG. 17.

In FIGS. 17 and 18 a further modified frame shield 10b is shown which is made in two sections 11a and 11b. Section 11a has an end portion 73 which is offset from its main body portion 74. Horizontal slots 75 are located in offset portion 73. The edge portion 76 of section 11b has vertical slots 77 therein. A space 79 is located between edge 80 of section 11b and edge 81 of section 11a. Nut and bolt connectors 82 fasten offset portion 73 to the edge portion of section 11b. By virtue of the foregoing connection, sections 11a and 11b can be adjusted relative to each other both horizontally and vertically to provide a better fit with the automobile body inasmuch as the shapes of the bodies of individual automobiles vary from each other.

While a single shield 10 has been described above, it will be appreciated that it is intended that shields such as 10 are to be used in mirror-image counterpart pairs on opposite sides of an automobile.

While the shield 10 of the present invention has been shown and described relative to a Corvette, it will be appreciated that, with suitable modification, it can be used with other automobiles.

While preferred embodiments of the present invention have been disclosed, it will be appreciated that the present invention is not limited thereto but may be otherwise embodied within the scope of the following claims.

I claim:

1. In an automobile having a frame, an automobile body mounted on said frame, an axle mounted on said frame, a wheel well within said automobile body, a wheel having inner and outer sides located in said wheel well and mounted on said axle, said wheel well including a first portion of said automobile body located in facing relationship to said inner side of said wheel and a second portion of said automobile body located proximate said outer side of said wheel, an opening below said first portion of said automobile body, and brake structure mounted relative to said axle, a shield mounted within said wheel well for protecting said frame and other portions of said automobile and said automobile body from matter thrown by said wheel during rotation thereof comprising a main body portion having a first side located in contiguous relationship to said first portion of said automobile body and having a second side facing said second portion of said automobile body, an upper edge on said main body portion, a lower edge on said main body portion, a forward edge on said main body portion, a rear edge on said main body portion, fastening means on certain of said edges for attaching said shield to said automobile body, said lower edge extending downwardly beyond said first portion of said automobile body for obstructing said opening below said first portion of said automobile body and also being substantially unattached relative to said automobile body and being of concave configuration for providing a clearance with said brake structure, and a front portion on said body portion, said front portion extending substantially perpendicularly to said body portion for shielding an adjacent portion of said frame, said forward edge portion being located above said front portion and extending substantially perpendicularly to said main body portion, and said front portion extending outwardly from said main body portion a greater distance than said forward edge portion, and said fastening means extending through said forward edge portion.

2. In an automobile as set forth in claim 1 including seal means interposed between substantial portions of certain of said upper, forward and rear edge portions and adjacent portions of said first portion of said automobile body for providing a seal therebetween.

3. In an automobile as set forth in claim 1 including a flexible skirt attached to said lower edge portion and depending downwardly therefrom.

4. In an automobile as set forth in claim 1 wherein said fastening means are located on said upper, forward and rear edge portions.

5. In an automobile as set forth in claim 1 including a shoulder on said front portion for mating engagement with an adjacent portion of said automobile body.

6. In an automobile as set forth in claim 1 wherein said rear edge portion extends substantially perpendicularly to said main body portion and wherein said fastening means extend through said rear edge portion.

7. In an automobile as set forth in claim 6 including a pocket-like concave depression located between said upper edge portion and said main body portion and the upper part of said rear edge portion.

8. In an automobile as set forth in claim 1 wherein said forward edge portion merges gradually into said upper edge portion.

9. In an automobile as set forth in claim 2 wherein said seal means comprises a moldable caulk-like seal interposed between said frame shield and said automotive body and formed to fit therebetween.

10. In an automobile as set forth in claim 1 wherein said shield comprises two separate halves, and means to adjustably secure said two separate halves relative to each other.

11. A shield for mounting in the wheel well of an automobile comprising a substantially planar main body portion having inner and outer sides, an upper edge portion on said main body portion, a forward edge portion extending outwardly from and substantially perpendicularly to said inner side, first fastener receiving hole means in said forward edge portion, a rear edge portion extending outwardly from and substantially perpendicularly to said inner side, second fastener receiving hole means in said rear edge portion, third fastener receiving hole means in said upper edge portion, a front portion located below said forward edge portion and extending substantially perpendicularly to said inner side and extending outwardly from said inner side a greater distance than said forward edge portion, and a lower edge of concave configuration on said main body portion.

12. A shield for mounting in the wheel well of an automobile as set forth in claim 11 including a flexible skirt attached to said lower edge portion and depending downwardly therefrom.

13. A shield for mounting in the wheel well of an automobile as set forth in claim 11 including a shoulder on said front portion for mating engagement with an adjacent portion of the body of said automobile.

14. A shield for mounting in the wheel well of an automobile as set forth in claim 13 wherein said forward edge portion is located above said front portion and extends substantially perpendicularly to said main body portion, and wherein said front portion extends outwardly from said main body portion a greater distance than said forward edge portion, and wherein said fastening means extend through said forward edge portion.

15. A shield for mounting in the wheel well of an automobile as set forth in claim 11 including a pocket-like concave depression in said outer side located between said upper edge portion and said main body portion and the upper part of said rear edge portion.

16. A shield for mounting in the wheel well of an automobile as set forth in claim 11 wherein said shield comprises two separate halves, and means to adjustably secure said two separate halves relative to each other.

17. A shield for mounting in the wheel well or an automobile as set forth in claim 11 including means dividing said substantially planar main body portion into relatively movable separate front and rear portions, and fastening means for adjustably securing said front and rear portions to each other.

18. In an automobile as set forth in claim 2 including a release agent between said shield and portions of said automobile body contiguous thereto, whereby said shield can be removed from its installed condition with the seal means adhered thereto.

19. In an automobile as set forth in claim 1 wherein said fastening means comprise a plurality of screw-receiving holes along certain of said edges, and screws extending through said holes and said automobile body to retain said seal means in good sealing relationship between said shield and said automobile body.

20. A shield for mounting in the wheel well of an automobile comprising a substantially planar main body portion having an upper edge, a concave lower edge, a forward edge, and a rear edge, fastening means on certain of said edges for attaching said shield to an automobile body, means dividing said substantially planar main body portion into relatively movable separate front and rear portions, and fastening means for adjustably securing said front and rear portions to each other, said means for dividing said substantially planar main body portion comprising a vertical end portion on said front portion offset from said main body portion, a plurality of vertically spaced horizontal slots in said vertical end portion, a plurality of vertically spaced vertical slots in said rear portion in underlying relationship to said horizontal slots, and said fastening means extending through pairs of said horizontal and vertical slots.

* * * * *